United States Patent
Wu et al.

(10) Patent No.: US 10,645,195 B1
(45) Date of Patent: May 5, 2020

(54) ADAPTIVE DATA TRANSFER PROTOCOL, SYSTEM AND METHOD

(71) Applicant: SIMBA TECHNOLOGIES INC., Vancouver (CA)

(72) Inventors: Jerry Wu, Vancouver (CA); Maria Kaardal, Vancouver (CA); Matthew Wozniczka, Vancouver (CA); Michael Sandberg, Vancouver (CA)

(73) Assignee: SIMBA TECHNOLOGIES INC., Vancouver (CA)

( * ) Notice: Subject to any disclaimer, the term of this patent is extended or adjusted under 35 U.S.C. 154(b) by 152 days.

(21) Appl. No.: 15/797,153

(22) Filed: Oct. 30, 2017

Related U.S. Application Data

(60) Provisional application No. 62/414,535, filed on Oct. 28, 2016.

(51) Int. Cl.
| | |
|---|---|
| *G06F 17/00* | (2019.01) |
| *H04L 29/06* | (2006.01) |
| *G06F 3/06* | (2006.01) |
| *H04L 29/08* | (2006.01) |
| *G06F 16/951* | (2019.01) |
| *G06F 16/23* | (2019.01) |

(52) U.S. Cl.
CPC .............. *H04L 67/42* (2013.01); *G06F 3/065* (2013.01); *G06F 3/0619* (2013.01); *G06F 3/0665* (2013.01); *G06F 3/0689* (2013.01); *G06F 16/2365* (2019.01); *G06F 16/951* (2019.01); *H04L 67/1002* (2013.01)

(58) Field of Classification Search
CPC ... H04L 67/42; G06F 16/2365; G06F 16/951; G06F 3/0619

USPC ................................................. 707/600–899
See application file for complete search history.

(56) References Cited

U.S. PATENT DOCUMENTS

2014/0169190 A1* 6/2014 Worrall .................. H04L 43/50
370/252

* cited by examiner

*Primary Examiner* — Isaac M Woo
(74) *Attorney, Agent, or Firm* — Tai W. Nahm; Miller Thomson LLP

(57) ABSTRACT

There is disclosed an adaptive data transfer protocol, system and method. In an embodiment, the method is operable on one or more computer devices in a client server data query environment, each of the one or more computer devices having a processor and a memory, the method comprising: opening a logical network connection between a client and a server, the server communicating with a data source; initiating a data request from the client; in response to the data request from the client, preparing a data transfer response from the server utilizing an adaptive data transfer protocol, the adaptive data transfer protocol configured to: create multiple network connections within the logical connection; analyze performance metrics including variable processor load on the one or more computing devices, and network load over the multiple network connections; analyze the data required to be retrieved from the data source and transferred over the multiple network connections; and adaptively prepare the data retrieved from the data source based on their data types and values for transfer over the multiple network connections to improve total response time to fulfill the data request.

17 Claims, 8 Drawing Sheets

ADAPTIVE DATA TRANSFER PROTOCOL, SYSTEM AND METHOD

RELATED CASES

This application claims the benefit of U.S. Provisional Application No. 62/414,535 filed on 28 Oct. 2016, the contents of which are incorporated herein by reference.

FIELD OF THE INVENTION

The present disclosure relates to data transfer protocols for enabling dialogue between a client application and one or more database servers.

BACKGROUND

Database queries performed over networks can experience various bottlenecks which may impact on performance. Possible bottlenecks may include one or more of the database configuration and design, the operating systems, the network protocols, application layer database query software for performing queries, inserts and updates, and various hardware limitations such as disk I/O performance and caching, available processing power, available memory, and network bandwidth limitations.

While computer and network hardware limitations may be addressed by upgrading performance limiting hardware if a bottleneck is in the operating system, network protocol, or data query software, then addressing the performance issues may become imperative. More specifically, if a data transfer protocol is limited to performing queries through a single network connection, as is often found in database installations, then the network throughput may be a bottleneck no matter the capability of the hardware resources. Even if a client-server system allows multiple logical connections between clients and the server, each logical connection uses one network connection to communicate with the server, and it is still necessary to effectively manage these connections for unpredictable database traffic between the client and server. Therefore, what is needed is an improved data transfer protocol, system and method which addresses at least some of these limitations in the prior art.

SUMMARY

The present disclosure relates to an adaptive data transfer protocol, system and method which effectively manages multiple network connections within a logical connection, and multiple logical connections from one or more clients to a server communicating with a data source. The adaptive data transfer protocol leverages the multiple network connections per logical connection for improved performance.

In an embodiment, the adaptive data transfer protocol and system comprises various aspects, including concepts; message format including opcodes, headers, numeric representation; data format including a compressed representation of data results; a request/response dialogue; exceptional messaging including cancelling requests; load-balancing redirection; organizing one or more network connections within a logical connection; and matching appropriate protocol versions between the client and server. Each of these aspects are described in detail further below.

In an embodiment, the adaptive data transfer protocol and system has a server side component which manages multiple adaptive strategies, such as adaptive compression and chunk size adaptation, that depend on the nature of the traffic and load. The adaptive data transfer protocol handles unpredictable traffic patterns by adaptive means, always using metrics that reflect the workload of the workers (e.g. number of requests per minute; number of responses per minute; CPU usage, number of active connections per minute, average time from receiving a request to sending a done response, etc.).

In another embodiment, the adaptive data transfer protocol, system and method compresses data for transmission over the network, based on knowledge of SQL data types, utilizing best-of-breed compression algorithms (i.e. in speed and compression ratio) for compressing integers, text data, floating point data, etc. in order to further improve performance.

In another embodiment, the adaptive data transfer protocol, system and method is configured to adaptively compress data for efficient data transmission over the network. Should the adaptive data transfer protocol, system and method determine that compression may not result in any significant performance improvements, or determines that the performance costs for compression exceed any expected performance benefit, then the adaptive data transfer protocol will not perform any compression, until it detects a change in the data, or network transfer speed, that may make compression desirable once again.

In another embodiment, the protocol, system and method allows a logical connection to open multiple network connections. Advantageously, the multiple network connections within a logical connection enable parallel streaming of result sets, parallel retrieval of binary long objects, and concurrent operations.

In this respect, before explaining at least one embodiment of the invention in detail, it is to be understood that the invention is not limited in its application to the details of construction and to the arrangements of the components set forth in the following description or the examples provided therein, or illustrated in the drawings. Therefore, it will be appreciated that a number of variants and modifications can be made without departing from the teachings of the disclosure as a whole. Therefore, the present system, method and apparatus is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The present system, method and apparatus will be better understood and objects of the invention will become apparent when consideration is given to the following detailed description thereof. Such description makes reference to the annexed drawings, wherein.

DETAILED DESCRIPTION

Figure 1:
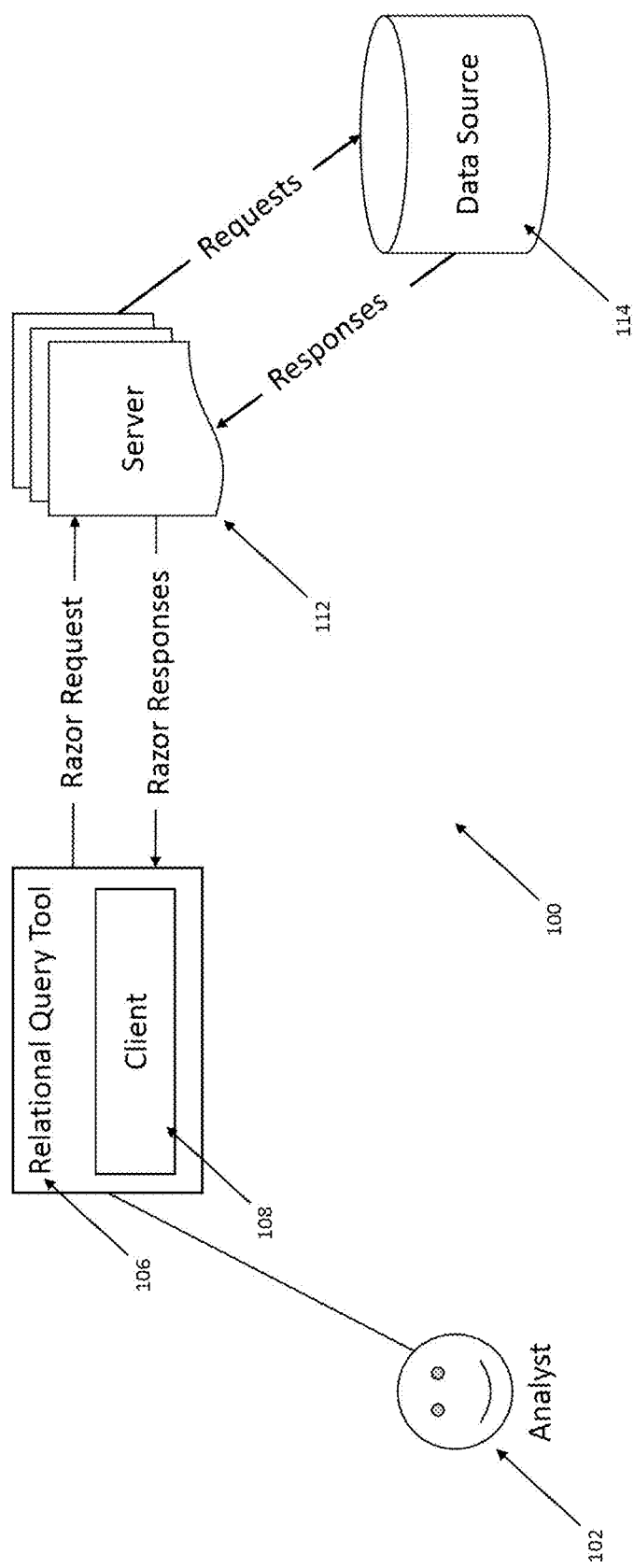
FIG. 1 shows a schematic block diagram of an illustrative client server data query environment.

As noted above, the present disclosure relates to an adaptive data transfer protocol, system and method which effectively manages multiple network connections within one logical connection, and multiple logical connections from one or more clients to a server via a request-response dialog.

As discussed below, one client may engage a server in one or more logical connections, and each logical connection may be composed of one or more network connections for improved performance.

Definitions

The following is a list of some terms as used in this specification, with their intended meaning in the present context.

Chunk: A block of information; an implied partial portion of a larger entity divided into such portions for some practical limitation unrelated to the data.

Client: The entity which sends requests to, and receives responses from, the server. It also manages the state of the logical connection.

Clone: A network connection other than the initial network connection made for a logical connection. It does not require the original login credentials of the logical connection (e.g. username and password), but ensures the same authentication and security.

Cluster: A collection of servers that are equivalent—able to serve any client with the same information.

Command: A string of one or more instructions from a client application to the data source.

Endianness: Storage format for multi-byte binary integers. These can either be stored least-significant-byte first ("little-endian"), or most-significant-byte first ("big-endian"). For example, the 32-bit integer value 1234567 has the hexadecimal value 0012D687. Least-significant-byte first, this would be stored as (87, D6, 12, 00).

Latency: the delay between the end of sending a request and the start of receiving the response.

Logical Connection: A two-ended means of communication, that mutually guarantees unique network identification and a reliable sequence of requests to process. A logical connection also defines mutually agreed-on state, above and beyond the current data in transit between the ends. Sometimes referred to as a session.

Monitor: A process with a unique network address, that provides statistics to a client about the servers in a cluster. The statistics allow the client to choose a server for its logical connection. Each worker periodically sends availability and load statistics to the monitor for their node. The monitor can create new workers, and terminate workers when they become idle. Each monitor in the cluster sends its information to all other monitors in the cluster.

Network Connection: A facility provided by computer operating systems, supported by a wide agreement of protocol standards, that ensures the data transfer requirement of a Logical Connection. Unique network identities are defined by (IP address, Port number).

Node: A server that is a member of a cluster.

Parameter: A value passed by the client for use by the commands in a query, at the time the commands are executed.

Parameter set: A list of values, corresponding to all the parameters to be used in a query. The protocol understands lists of parameter sets, which imply as many executions of the entire query, as there are elements in the list.

Server: A collection of processes on a single computer. A server is identified by a unique public network address, to which a client connects. Usually, there is only one server per computer. The server has at most one monitor (see below) and at least one worker.

Slick Chunk: A chunk that contains a set of complete rows, compressed.

Worker: A process that responds to client requests. The same worker handles all requests for a given logical connection. A worker may handle multiple connections concurrently. A worker is idle if no clients have logical connections to it.

Various aspects of the adaptive data transfer protocol, system and method will now be described with reference to the figures.

Referring to FIG. 1, shown is a schematic block diagram of an illustrative client server data retrieval environment 100. As shown, the environment 100 includes a user 102 making use of a desktop computer device 104, such as a generic computer device 800 illustrated in FIG. 8. The desktop computer device 104 is operatively connected to and makes use of an intermediary software module 106 which executes a request for data.

As shown in FIG. 1, in an embodiment, the client program 108 on intermediary software module 106 executes an embodiment of the adaptive data transfer protocol to connect to the server 112, and makes requests and receive responses via one or more established network connections to the server 112.

In an embodiment, there may be more than one client program 108 establishing connections to the server 112, and thus multiple clients (e.g. an ODBC client, a JDBC client, etc.) making simultaneous query requests, and receiving responses from the server 112.

Still referring to FIG. 1, server 112 accepts connections and services requests utilizing a server side component of the adaptive data transfer protocol. In an embodiment, a server process or worker handles all actions for a given logical connection (e.g. ODBC, JDBC, etc.), as described in further detail below. However, as a work load increases, multiple workers on the server may have the work load distributed among them. Within a single cluster node, workload distribution across worker processes is controlled by the workers directly. Across nodes, the distribution of the workload is controlled by the client's use of the workload metric information returned by the protocol.

In an embodiment, a logical connection is established between the client program 108 and the server 112, and corresponds to an ODBC connection or JDBC connection, for example.

Figure 2:
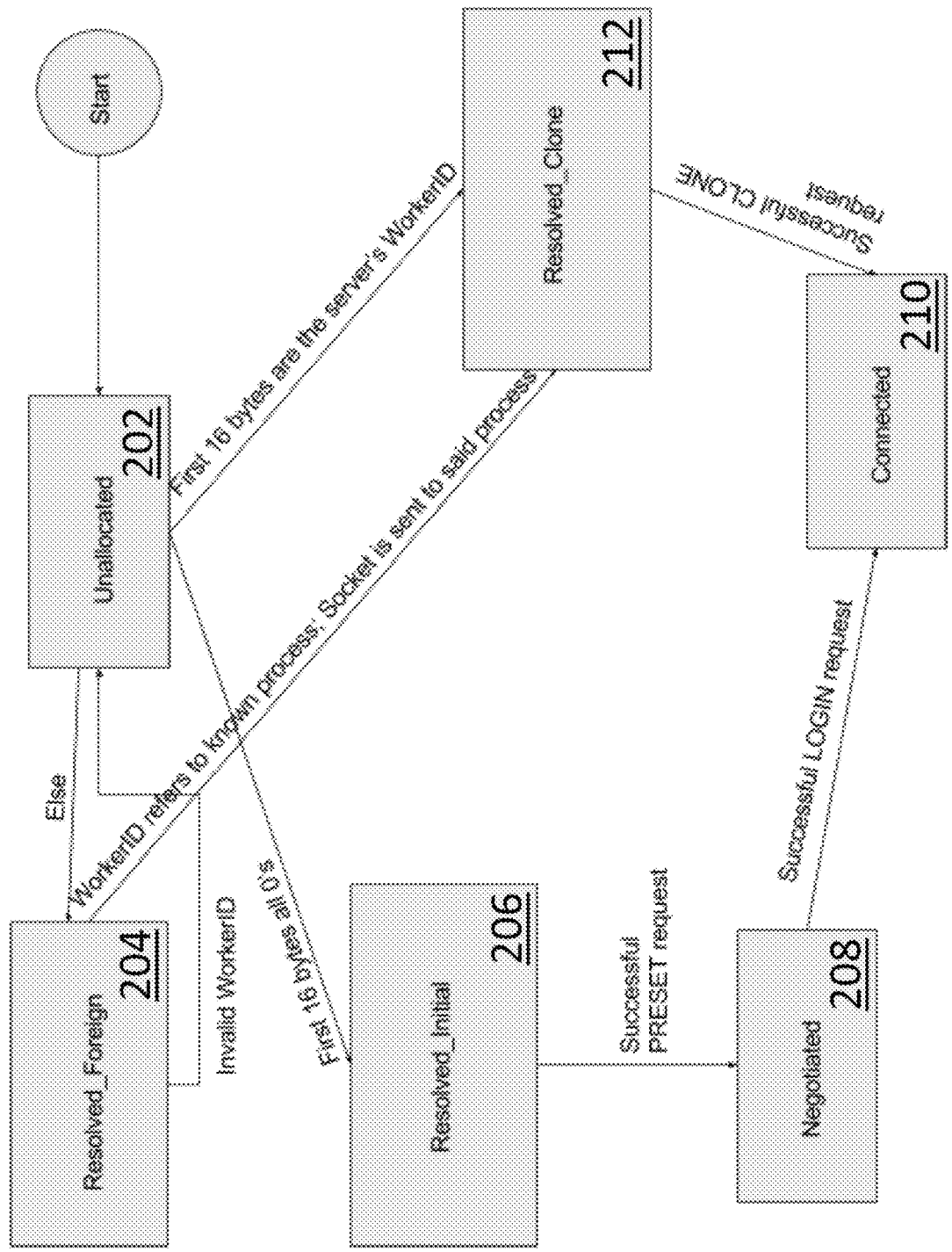
FIG. 2 is a state transition diagram showing how a connection is established using the adaptive data transfer protocol.

Now referring to FIG. 2, a state transition diagram showing how a connection is established using the adaptive data transfer protocol. In an illustrative embodiment, a connection has connection properties which can be get or set. The set of valid properties and their semantics may depend on the particular embodiment of the protocol.

As shown in FIG. 2, a network connection can be in various states. The 'Unallocated' state at box 202 is the initial state of a new network connection. An active logical connection has 1 or more network connections.

The server will read the first 16 bytes sent from the client. If they are all 0 bytes, then this indicates a new logical connection, and the network connection goes to a 'Resolved_Initial' state at block 206. Otherwise, these bytes are the worker GUID of the worker the client wishes to connect to. If this corresponds to the worker GUID of the accepting worker, the network connection state goes to the 'Resolved_Clone' state at block 212. Otherwise, the network connection goes to the 'Resolved_Foreign' state at block 204. In either case, the network connection is not yet associated with a logical connection, and will not be until it leaves one of the aforementioned states.

At block 206, the 'Resolved_Initial' state goes to the 'Negotiated' state at block 208 after the successful completion of a 'PRESET' request as described further below. Valid requests are: PRESET, PREGET, SSL, and KERB, as detailed further below.

Still referring to FIG. 2, the 'Negotiated' state at block 208 goes to a 'Connected' state at block 210 after a valid LOGIN request. Valid requests in the 'Negotiated' state include PREGET, PRESET, KERB, BROWSE, SSL, and LOGIN. In the 'Connected' state, valid requests include GET, SET, TEST, NSQL, RESET, and any requests which are valid given the state of the statement they are invoked upon.

The 'Resolved_Clone' state at block 212 goes to the 'Connected' state at block 210 after a successful CLONE request. Valid requests are: SSL, CLONE, as detailed further below.

In an embodiment, at the 'Resolved_Foreign' state at block 204, the worker will pass the connection to the worker associated with the given worker GUID, unless no such worker exists, in which case the connection will be immediately dropped.

Figure 3:
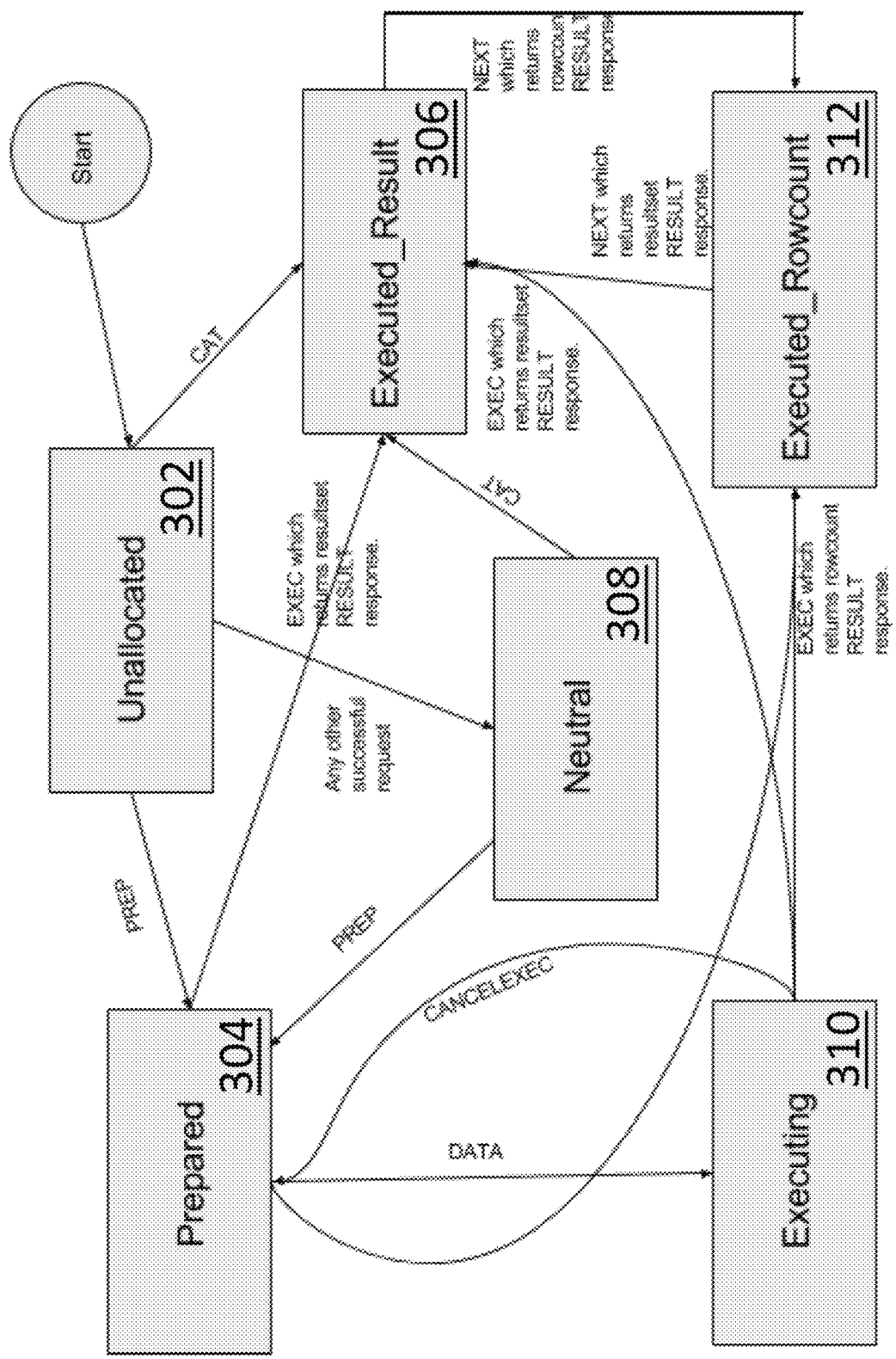
FIG. 3 is a state transition diagram of various states of a statement in an adaptive data transfer protocol in accordance with an embodiment.

Now referring to FIG. 3, shown is a state diagram of various states of a statement in an adaptive data transfer protocol in accordance with an embodiment.

In an embodiment, as an example, a Statement corresponds to an ODBC/JDBC statement. A connection has 0 or more statements. An active statement is uniquely identified, within the scope of a logical connection, by a non-zero unsigned 32-bit number known as the statement handle. For contexts in which either a statement or the entire connection can be referred to, the connection is referred to by using a handle of 0.

The client allocates a statement handle on the server implicitly, whenever an unallocated handle value is used in a request. The client returns the handle to the unallocated state using a FREE request.

In an illustrative embodiment, a statement may have properties which can be get or set with corresponding requests. The set of valid properties and their semantics depends on the specific embodiment of the protocol. However, both client and server enforce serialization of request processing for a given statement.

Still referring to FIG. 3, in an embodiment, a statement can be in several different states. As shown, a statement may be in an 'Unallocated' state at block 302. A statement begins in the 'Unallocated' state at block 302 until referenced, and returns to the 'Unallocated' state when it is freed using a FREE request.

From the 'Unallocated' state, the statement may go into an 'Executed_Result' state at block 306, after a successful metadata request; into a 'Prepared' state at block 304 after a successful prepare request; and finally into the 'Neutral' state at block 308 after any other valid successful request which references it.

On an unsuccessful request, the statement may stay in the unallocated state, or may move to a 'Neutral' state at block 308, depending on whether the statement was allocated in the server before the error occurred.

Still referring to FIG. 3, the 'Neutral' state at block 308 may be entered after creation. A statement may proceed from the 'Neutral' state to go to a 'Prepared' state at block 304, after a successful prepare request. From any state, the statement goes to an 'Unallocated' state after a successful free handle request.

Still referring to FIG. 3, from the 'Prepared' state, which is the state after a successful prepare request, the statement may enter into either the 'Executed_Result' state at block 306 or the 'Executed_Rowcount' state at block 312 upon a successful execute request. Alternatively, upon a successful request to upload input parameter data, the statement moves to the 'Executing' state at block 310. The statement may also move to the 'Executing' state if the server responds to the execute request with a "need input parameter" data response. The statement may go to the 'Prepared' state at block 304 from the 'Executing' state at block 310 upon a successful cancel request.

After a successful Execute request, a Result response—which may be a data result or a rowcount result—will be returned. If that response indicates that the first result is a resultset, the statement goes to the 'Executed_Result' state at block 306, otherwise it will go to an 'Executed_Rowcount' state at block 312. At the 'Executed_Result' state at block 306, data may be retrieved from the statement.

From the 'Executed_Result' state at block 306 or 'Executed_Rowcount' state at block 312, a next result request may either cause the statement to move to one of the two aforementioned states—if there is another result of some kind—or to the 'Prepared' state at block 304 otherwise.

(2) Message Format

In an embodiment, the adaptive data transfer protocol can be broken down into two discrete units: requests and responses, as will now be described.

A request is a message from the client to the server, while a response is a message from server to client. Each response is associated with a preceding request by its Request ID. A request and its associated responses have identical Request IDs in their headers.

Figure 4:
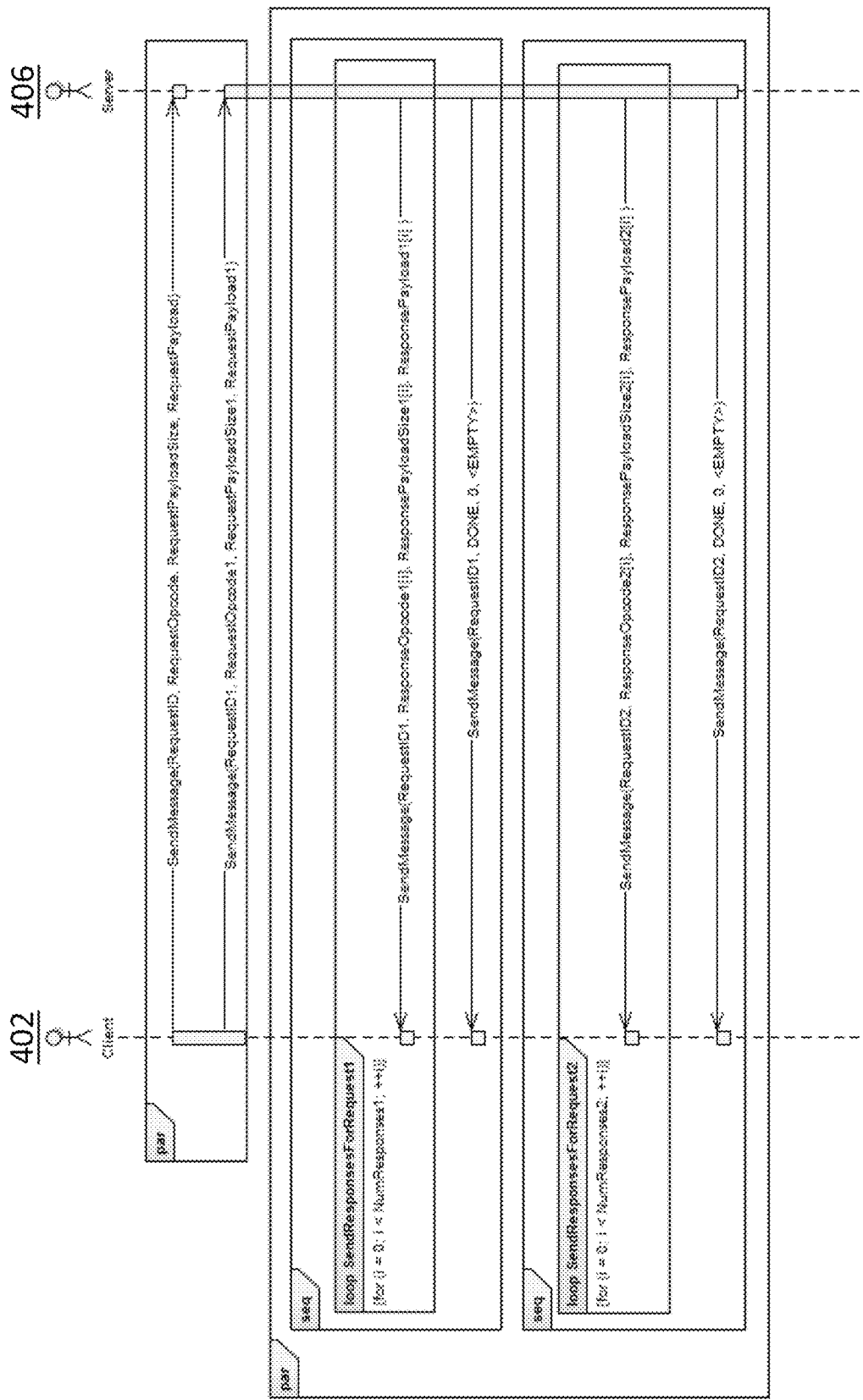
FIG. 4 shows an interaction diagram illustrating a system and method for making a request/response flow between a client and a server.

In an embodiment, each message consists of a contiguous sequence of bytes being sent either from client to server or vice versa. A message has two parts: a header and a body. As an illustrative example, the header may be fixed-length at 12 bytes, split into three 4-byte little-endian unsigned integers in the following order: RequestID, OpCode, and PayloadSize. The flow between the client 402 and server 406 is illustrated by way of example in FIG. 4.

RequestID is a unique identifier for a live request on a given logical connection. A request is considered 'live' when the client has sent all or part of the request to the server, but has not yet received a DONE response from the server with that request's RequestID. As soon as a request completes (i.e. client receives DONE), the client is allowed to reuse the RequestID for a new request, but not before. Two distinct logical connections may be simultaneously using the same RequestID without conflict on the server.

OpCode defines the type of the message. Some opcodes are used both in requests and responses.

PayloadSize is the size of the associated following payload, in bytes. A message may have an empty payload, depending on the opcode.

Within a payload, depending on the opcode, a fixed set of message parameters will be serialized. By way of example, the following message parameter 'types' are supported:

- Unsigned Integer—Range is [0, 2^64−1], serialized by storing a variable-length series of 1 . . . 10 bytes. The integer is broken into 7-bit chunks, stored in the high seven bits of each byte. The chunks are stored in most-significant-byte-first order. High zero chunks are not stored. The bottom bit of the last chunk is set to 1. An exception is (0) which is stored as a single zero byte.
- Signed Integer—Range is [−2^63, 2^63−1]. This is encoded by "folding" to an unsigned integer, then storing as described above. "Folding" maps 0 to 0, 1 to 1, −1 to 2, 2 to 3, . . . i.e. in order of minimum absolute value, alternating positive and negative values.
- String—Serialized as a byte count (unsigned integer above) followed by the string data in utf-8 encoding (no null-termination)
- Binary—Same as string, but data portion is unconstrained
- SlickChunk—Similar to Binary, with two differences:

The length is serialized as a 4-byte little-endian unsigned integer, rather than the usual variable-length integer.

An empty SlickChunk is represented by a zero length (i.e. 4 zero bytes followed by 0 bytes of SlickChunk data; this avoids the need to send the SlickChunk header)

- List<T>—Serialized as a count of items in the list (see unsigned integer above), followed by the serialization of the first item in the list, followed by the serialization of the second item in the list, etc.
- Map<K, V>—Let the serialization of Pair<K, V> be the concatenation of the serialization of K and the serialization of V. To serialize Map<K, V>, we view it as a List with an even number of values of alternating types K and V.
- Variant—A Variant is a discriminated union of the following types (typecodes): WSTRING (0), STRING (2), UINT16 (2), UINT32 (4), UINT64 (5), INT16 (6), INT32 (7), INT64 (7), BOOL (9). It is serialized as the typecode as above (so 0 for WSTRING, 4 for UINT64, etc.), followed by an unsigned integer taking on the value 0 or 1. If 0, this indicates that the value of the variant is 'null'. If 1, this is followed by the serialization of the Variant's value as a String (see above)
- ConnectionSetting—A ConnectionSetting consists of a Label (String), Status (unsigned integer; 0 for 'optional', 1 for 'required', 2 for 'processed'), and ValidValues (List<String>). It is serialized by serializing those three fields in that order.
- ConnectionSettingsResponseMap—A Map<String, ConnectionSetting>, it is serialized as such. One difference from a simple map is that the map key is treated case-insensitively by both client and server, although this is not validated upon deserialization (instead, the later entry will override the earlier in case of 'duplicates')
- AttributeData—An AttributeData is a discriminated union of the following types: WSTRING ('W'), UINT16 ('S'), INT16 ('s'), UINT32 (T), INT32 (T), UINTNATIVE ('N'), INTNATIVE ('n').

The types are self-explanatory (i.e. INT16 is a 16-bit signed integer, while UINT32 is a 32-bit unsigned integer). INTNATIVE/UINTNATIVE are 'native-sized' integer (so, 32-bit on a 32-bit platform and 64-bit on a 64-bit platform).

It is serialized by as follows:

A NULL AttributeData is serialized as an unsigned integer, with the ascii value of 'X'

Otherwise, first the typecode is serialized as an unsigned integer (the ascii value of the character associated with each type above, i.e. 'W' for WSTRING. 'S' for UINT16, etc.), followed by the value of the attributeData in serialized form. For WSTRING, the value is serialized as String (see above), for UINT16, UINT32, and UINTNATIVE the value is serialized as unsigned integer (see above), and for INT16, INT32, and INTNATIVE the value is serialized as a signed integer (see above)

- Bool—By convention, a boolean value is serialized as an Unsigned Integer, with 'true' being represented by 1, and 'false' by 0.
- Pair<T, S>—A pair is serialized by concatenating the serialization of the first element with the serialization of the last.

(3) Data Format and Compression

Figure 5:
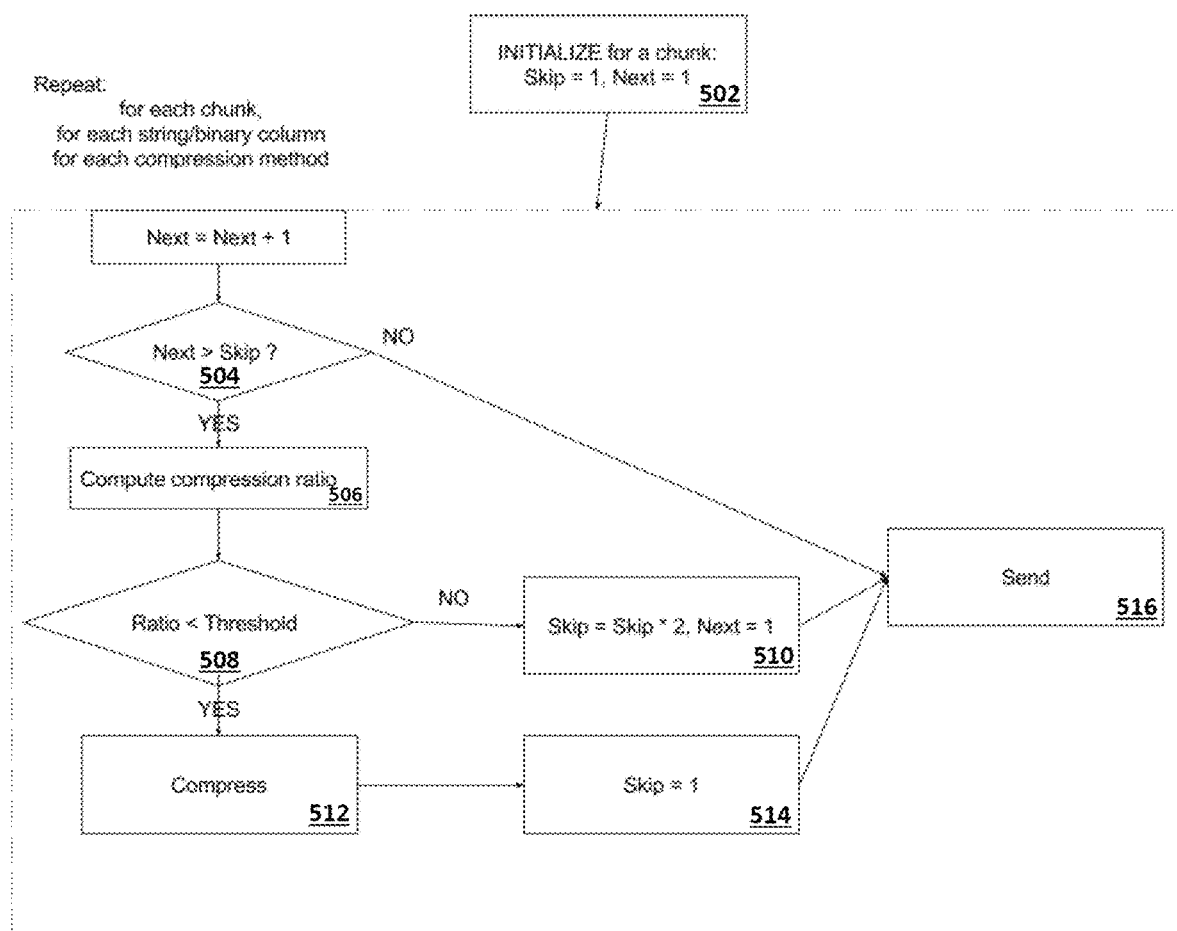
FIG. 5 shows a flow chart of an illustrative process, in accordance with one embodiment, for applying an adaptive compression algorithm on data for efficient transmission over the network.

Now referring to FIG. 5, shown is a flow chart of an illustrative process, in accordance with one embodiment, for applying an adaptive compression algorithm on data for efficient transmission over the network. As shown, the compression process is initialized at block 502, and proceeds to decision block 504 where the process determines of Next>Skip. If yes, the process proceeds to block 506 where a compression ratio is computed. If no, the process proceeds to block 516 where the chunk is sent without compression. From block 506, the process proceeds to decision block 508, where the process determines if the compression Ratio is less than a Threshold value. If no, the process proceeds to block 510 where compression for the chunk is skipped, and the process proceeds to send the chunk at block 516. If yes, the process proceeds to block 512 where the chunk is compressed, and proceeds to block 514 where Skip is set to 1. From block 514, the process proceeds to block 516 to send the compressed chunk. This adaptive test process is applied for each relevant compression method in sequence, for every column of each chunk. The results of a preceding compression method are passed as input to the following compression method.

In an embodiment, column and parameter data is sent between client and server in Slick chunks.

A Slick chunk is the serialization of one or more rows of data in a column-wise, compressed format. By way of example, each column can be of one of the following types: DBL: 64-bit floating-point; ETC: variable-length byte string; FLT: 32-bit floating point; and 108, U08, 116, U16, 132, U32, 164, U64: signed/unsigned 8/16/32/64-bit integer. Structured types, such as time/date/timestamp, are decomposed into their primitive fields and represented as a set of Slick columns.

In an embodiment, each column has type-specific compression methods applied. If all values are null, the entire column is stored as a single (0) flag. If all values are not null, a flag equal to 2 is sent. If some values are null, a non-zero flag equal to 3, is sent, and followed by a bitmap indicating null values. All following compressions only apply to non-null values.

Advantageously, unassigned integers are stored as packed variable-bit-width elements, preceded by a vector of their widths, i.e., the number of bits required to store each integer value. (0) is stored as a zero-width value. The most significant bit of all nonzero values is also not stored, since it is always known to be 1, due to the packing algorithm. Instead of sending a vector of actual widths, the minimum bit width in the vector is computed, and subtracted from all the other values in the width vector, creating a 'delta' vector. The packed width vector has the following form: the minimum width value, followed by the delta bit-width, followed by the bit-packed vector of deltas.

The delta bit-width value is the number of bits required to store the largest value in the delta vector.

In an embodiment, signed integers are mapped to unsigned integers such that signed integers with small absolute values are mapped to small unsigned values. 0 is mapped to 0, 1 is mapped to 1, −1 is mapped to 2, 2 is mapped to 3, −2 is mapped to 4, etc. In another embodiment, 32-bit floating-point values are stored as 4 bytes, without compression. 64-bit floating-point values (doubles) are stored as variable-byte-length fields of 0-8 bytes, preceded by a width vector, where widths in this context are the number of bytes in each variable-byte-length field, similar to the bit width vector for integers.

Double compression uses the fact that doubles frequently represent decimal fractions (e.g. 49.95, 98.6, 1.005). IEEE-754 doubles for all 1-digit fractions and some 2-digit fractions have repeated trailing hex digits ("hexits"). This is similar to why a fraction like 4/9 is decimal 0.444444 . . . .

In an embodiment, the numbers are multiplied by 5.0, then tested that dividing by 5.0 restores the exact original value. Multiplying by 5.0 ensures that all 2-digit decimal factions and some 3-digit fractions have representations with repeated trailing hexits. Trailing bytes are discarded, beyond the last byte whose low four bits are the repeated hexit. (0.0) is stored as 0 bytes, 2.0 (for example) is stored as 1 byte, etc. As a further example, the number 12.34 has the internal binary (hex) representation 0x4028ae147ae147ae. 12.34×5 is 61.7, which has the internal binary representation 0x404ed999999999. This is transmitted as 3 bytes (0x40, 0x4e, 0xd9). On the receiving side, the last four bits are repeated to fill out the full 64-bit value. The resulting number is divided by 5.0 to re-create the original value (12.34).

Advantageously, the above described double compression process results in significantly reduced data size and improved data transfer performance in comparison to previously known compression algorithms.

Binary and string values have three independent methods applied in sequence: Prefix, Dictionary, and Huffman.

For the prefix method, if all values have a common prefix, that prefix is stored only once; what remains is the common prefix and the suffixes.

For the dictionary method, a dictionary of unique values is built, and stored as: the bytes of the unique values, a vector of the lengths of the unique values, and a vector of dictionary indices. The length and index vectors are stored in the same way as the width vectors for unsigned integers.

By way of example, and not by way of limitation, Canonic Huffman compression may be applied after prefix and dictionary compression. Unencoded bytes are mapped to variable-bit-width symbols, which are represented least-significant-bit-first. This permits two decoding optimizations: (1) Canonic Huffman guarantees that the most frequent symbol is encoded as N zero bits. A single machine instruction computes C the number of leading zero bits in the stream of compressed data. The number of occurrences of the most frequent symbol is N÷C. (2) Let the longest encoded symbol have M bits. The leading (low) M bits of the encoded stream are used as a lookup index, in a table that maps those bits to an original input byte value and its Huffman symbol length. Input bytes whose symbols are less than M bits long occur repeatedly in the lookup table. This operation completes all decoding for one output byte in one table lookup.

Both Dictionary and Huffman methods use adaptive back-off, to ensure little time is wasted when they are unsuccessful. If either fails for a given chunk, compression is not attempted for the following chunk. If it is unsuccessful again on the following chunk, it is not attempted for 2 more chunks; then 4 chunks, 8, 16, etc. If it succeeds on some later chunk, the sequences for failure back-offs restarts at 1. This process is described in FIG. 5.

The adaptive compression module, also known as Slick, is also used to avoid the issue of endianness differences between client and server: all values are set and get via the Slick interfaces in the local machine's endianness, and the Slick serialization format stores all data in platform-independent format (optimized for the most common hardware).

There is a trade-off between compression and latency when choosing a size for Slick chunks. The larger the Slick chunk, the better the compression, but the worse the latency for the client. The server tunes Slick chunk size dynamically in response to the actual compression ratio for the previous chunk in the result set, as well as the network throughput it is achieving in sending the data back to the client. As there is no historical data to go on for the first chunk in a result set, rows are collected until a simple row limit (e.g. 200 rows) or time limit (e.g. 20 msec) is reached. At this point, the rows are compressed as a Slick chunk. The ratio of chunk size to number of stored rows is used to determine for the following chunk the number of rows at which to stop collection, aiming for a chunk size that is an efficient network transmission unit.

Large object, or LOB values are not sent in-line with other data. If the client needs the data for a large cell, it can make use of the NEED request to retrieve the data separately from the rest of the data in the result. The client uses the row, relative to the current Slick chunk, and column of the cell in the NEED request. LOBs associated with previous Slick chunks are discarded. This saves bandwidth if the client doesn't need the LOB data.

In an embodiment, column data is sent from the server to the client in ROWS responses. A ROWS response is sent in reply to either an CAT, EXEC, FETCH, or NEXT request. A ROWS response contains two Slick chunks: one for data and one for flags. The flags Slick chunk is a matrix of 0 or 1 values. Each cell in the flags Slick chunk corresponds to the cell at the same row and column in the corresponding data Slick chunk and denotes extra information about that cell. A flag of 1 indicates the cell contains LOB data, which needs to be requested separately, as described above. Otherwise, the flag is 0.

The client sends a STOP message if it wants the server to pause sending ROWS responses. This can happen if the client, for whatever reason, cannot process the data as fast as it is being sent back. This mechanism allows the client to limit how much data is cached locally.

Parameter data can be split into two cases: input parameter data and output parameter data.

Input parameter data is sent to the server similarly to how column data is sent from the server to client. It is split up into two Slick chunks, one for data, and one for flags. In both of the Slick chunks, each parameter is a column and each set of parameter values is a row. The flags Slick chunk is again a matrix of 0, 1, and 2 values, 1 indicating that the parameter was pushed (described below), and 2 indicating that the parameter was set to 'default' (See SQL_DEFAULT_PARAM). Otherwise the flag is 0. A 'pushed' parameter is one whose data was provided separately before the EXEC request, in one or more DATA requests.

Output parameter data is sent back similarly to column data, except that there is no flags chunk—all data, no matter the cell length, is sent back directly in the main Slick chunk as part of a PARAMS response to an EXEC request. The parameter data may be split across multiple successive PARAMS responses.

While an illustrative example of an adaptive compression algorithm has been described above, it will be appreciated that various other types of compression algorithms may be used. However, as summarized in FIG. 4, the present adaptive data transfer protocol will employ compression only to the extent that transmission of the data is improved. If the achievable compression ratio is less than a given threshold which would result in significant savings in time, a data chunk is sent uncompressed.

(4) Request/Response Dialog (4a) Connection to Servers

Figure 6:
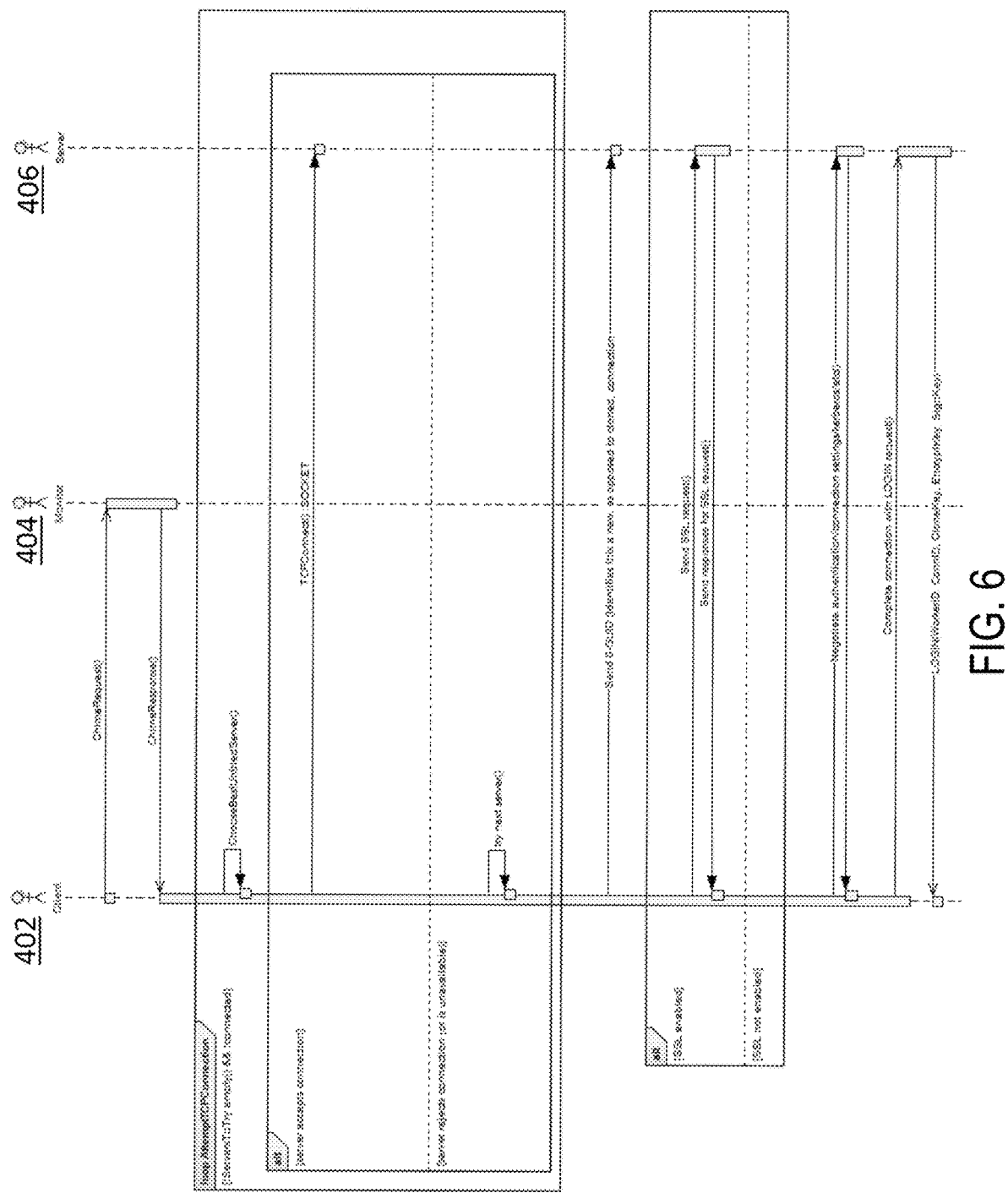
FIG. 6 shows an interaction diagram illustrating a system and method for establishing a connection between a client and a server via an intermediary monitor.

Now referring to FIG. 6, shown is an interaction diagram illustrating a system and method for establishing a connection between a client 402 and one or more servers 406 via an intermediary monitor 404.

As shown, the client 402 initiates a CHIME request to the monitor 404 and awaits a CHIME response. The client 402 then iterates over a list of <Address, port> pairs, trying to establish a network connection with the best untried server 406 in each in turn.

Once a network connection to a server 406 has been has been established, the client 402 sends an all-zero worker GUID on the established logical connection. This tells the server 406 that this is a new logical connection (as opposed to one which will send a CLONE request later to associate itself with an existing logical connection). This is done to distinguish a new logical connection from a cloned network connection, as a CLONE request would be preceded by a nonzero worker GUID. Multiple workers may be listening for connections on the same port. If the worker that accepts the network connection is not the one identified by that non-zero GUID, the worker hands off the network connection to the correct peer worker process.

Figure 7:
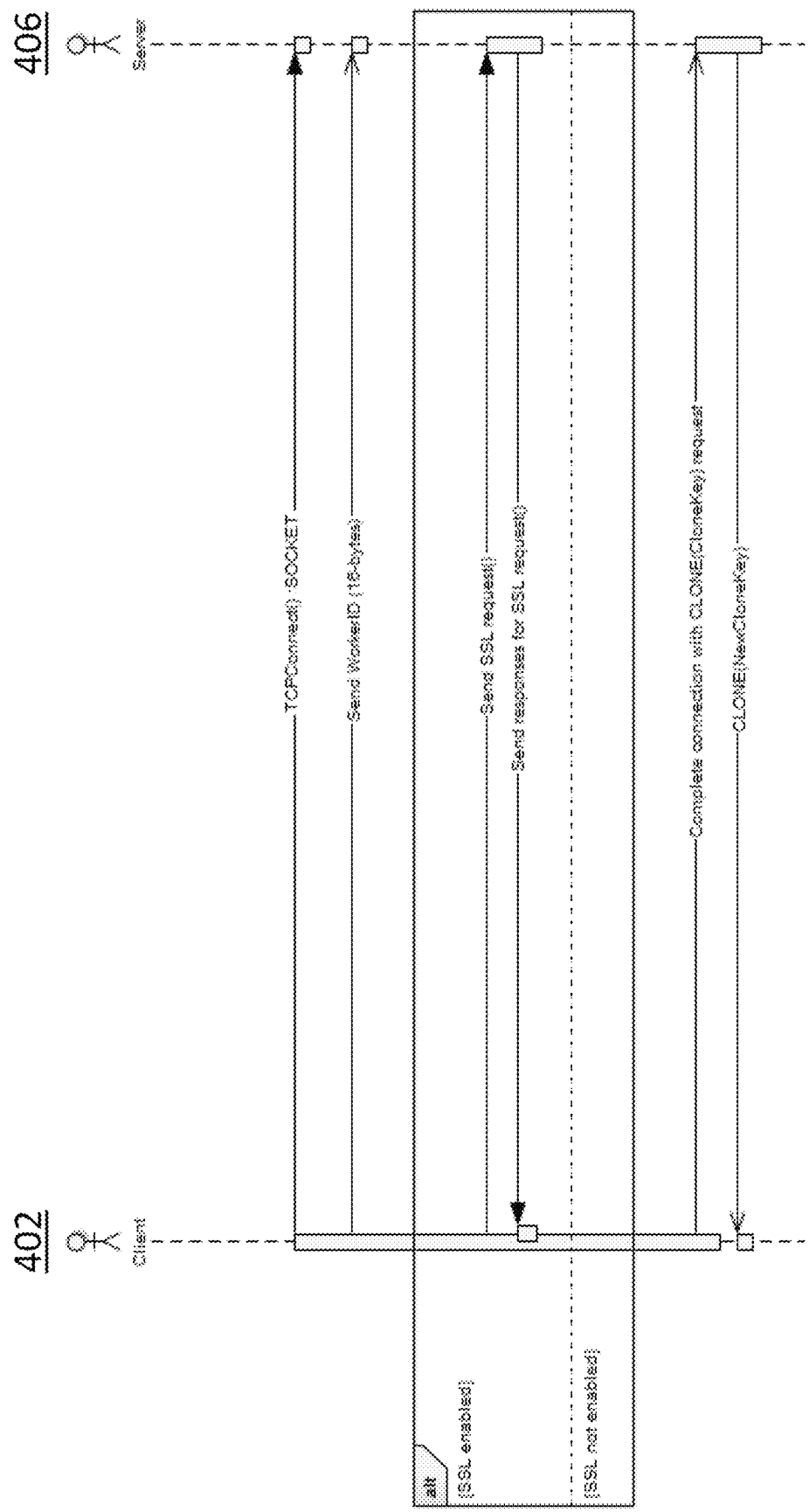
FIG. 7 shows an interaction diagram illustrating a system and method for cloning a TCP connection within a connection between a client and a server.

With reference to FIG. 7, if the client 402 wishes to use SSL on the network connection, it will then send an SSL request over the socket. The server 406 will then respond with one of the following:

An SSL response, followed by a DONE response if the server supports the use of SSL. Directly after sending the DONE response, the server will begin SSL negotiation on the network connection. The client, upon reading the DONE response from the network connection then begins its side of the SSL negotiation. If the negotiation fails, both client and server close the network connection, and the client returns an error to the application. Otherwise, the connection process is continued.

An INFO response indicating an error, followed by a DONE response. In this case, neither client nor server begin SSL negotiation, and if the client was configured such that SSL was required, it would then drop the connection, returning an error to the application. Otherwise, the connection process would continue without enabling SSL.

In an embodiment, the client 402 and server 406 perform a handshake with PREGET and PRESET requests which get server information and provide client information to the server, respectively.

If the client is configured to use a network authentication protocol, such as Kerberos, the client performs a negotiation with the server with KERB requests and responses. If an error occurs during such a negotiation, the client and server may either fallback to using basic authentication or terminate the connection.

Optionally, to allow for connection setting negotiation (Like SQLBrowseConnect in ODBC), the client may send one or more BROWSE messages. The server may return a non-empty BROWSE response which contains missing required or optional settings, or, in the case of an invalid setting key or setting value, may return an INFO response with an error. Once the BROWSE response contains no required settings, the server is ready to accept the given settings, and the client moves on to the next step of establishing a logical connection.

Once settings are negotiated, the client will send a LOGIN request with connection settings to the server. If the login fails, the server will return an INFO response indicating one or more error(s). Otherwise, the server will return a LOGIN response, letting the client know that it has successfully connected.

At this point the client may do GET and SET requests to synchronize connection properties between it and the server.

(4b) Disconnection

To disconnect, the client closes all network connections belonging to the logical connection. Before it does this, it may optionally free statement handles, and explicitly commit/rollback the current transaction.

Additionally, if either the client or server detect unrecoverable protocol errors at any point (i.e. invalid values, lengths, etc.), they will disconnect the logical connection.

(4c) Getting Database Metadata

In order to obtain data source metadata, the client sends a request for metadata using a statement handle.

The server will attempt to retrieve the requested metadata. On success, the server returns a RESULT which provides the number of rows in the result (if known), followed by a COLS response which provides the column metadata for the result.

The statement is now in the 'Executed_Result' state, and the server will continue returning ROWS responses until either the entire result has been returned, a ROWS response containing a long data cell is returned, or the server receives a STOP request from the client.

(4d) Preparing a Command

The client sends a PREP request using a statement handle for a command.

The server attempts to prepare the given command, and on success returns a PREP response which indicates metadata for the first result of the prepared command. If that first result is a result set (i.e. a set of rows), then it will then send back a COLS response containing column metadata for the first result of the execution.

The statement is now in the 'Prepared' state.

(4e) Executing (or Re-Executing) a Prepared Query

After preparing a command on a statement, the client may execute or re-execute the prepared command using the statement. If a command contains parameters, the client may optionally send the parameter values to the server by sending one or more DATA requests with the statement's handle. The client may do this before execution. If it does not, and parameter data is missing at execution time, the server will request it at that time using a NEED response. Any data sent in a DATA request may be omitted from the following EXEC or PARAMS requests.

The client executes or re-executes the prepared command using an EXEC request. The client may send any additional parameter data as part of the EXEC request. If it does not, the client enters the 'Executing' state and the server responds with a NEED response followed by a DONE response. The client must then send the missing parameter data to the server using either PARAMS or DATA requests.

In either case, the next responses are returned either from the EXEC request or the final PARAMS request.

If execution of the command caused the data source to implicitly end a transaction, the server will next return a TRANS response which indicates this.

Next, the server returns an EXEC response with the number of results, status of the parameter sets, and output parameter data. Similarly to the EXEC request, the server may choose to split parameter set statuses and output parameter data across multiple messages. In this case, the first portion of the output parameter data will be provided in the EXEC response, while the remaining data will be provided by one or more PARAMS responses directly following the EXEC response. The server may omit output parameter data from the PARAMS or EXEC response, similarly to ROWS responses. In this case the client may request the data at a later time using a NEED request.

Once all output parameter data has been returned to the client, the server then returns a RESULT response which describes the first result.

If the current result is a result set, the statement is in the 'Executed_Result' state. Otherwise, the result is a row count result and the statement is in the 'Executed_Rowcount' state.

In the 'Executed_Result' state the server sends back a COLS response to describe the metadata of the result, and then starts sending back ROWS responses.

In the 'Executed_Rowcount' state the server sends back the count of rows as part of the RESULT response.

(4f) Moving to the Next Result

The client sends a NEXT request for a statement which is either in the 'Executed_Result' or 'Executed_Rowcount' state to move to the next result.

If there are no more results, then the server returns DONE. The statement is now either in the 'Prepared' or 'Neutral' state, depending on how it came to be in the current state.

Otherwise, the next result becomes the current result. If the new current result is a result set, the statement goes into the 'Executed_Result' state, otherwise it goes into the 'Executed_Rowcount' state.

If the new current result is a result set, a COLS response, followed by a stream of ROWS responses is returned in the same manner as described previously.

(4g) Retrieving LOB Data

LOB data is a cell of column data which was too large to put directly into a ROWS response, so instead, the server indicates this by setting a flag in the associated 'flags' slick chunk, and allowing the client to retrieve this data with one or more separate NEED requests. The server will return one or more DATA responses which contain chunks of the data from the requested cell. The client may request the chunks of data for a given 'long data' cell in any order, and retrieve it any number of times until the 'long data' cells are invalidated. It may interleave NEED requests for different 'long data' cells in any order.

When any ROWS response is associated with such a LOB data cell, the server will halt returning ROWS responses for the request in question, and finish the request with a DONE response. It is then the client's responsibility for resuming the flow of result set data with a subsequent FETCH request. The client may only retrieve a LOB data cell between the ROWS response which declares its existence, and the next, CAT, FETCH, FREE, EXEC or CANCELEXEC request sent for the statement.

(4h) Pausing the Flow of Data

The server responds to some requests with arbitrarily many responses. The client may use the STOP request to pause these responses. One reason to do this is to avoid memory exhaustion, although for this, the client may stop reading from the network connection. Another reason is so that the network connection can be used for other purposes. This process is described in more detail in section (5a)

When the server receives the STOP request, and when it finishes sending back the current response, it does not send any more responses for that request, and sends DONE instead.

The client resumes the flow of data by sending a new request.

(4i) Setting Connection or Statement Property

To set statement or connection properties on the server, the client sends a SET request.

The server sets the properties, and if all are successful, it returns a DONE request. If an error occurs when setting a property, or the property is not recognized, it sends a SET response which contains information about which properties could not be set.

(4j) Beginning or Ending a Transaction

By default, a new connection is in autocommit mode. That means that every operation is implicitly done in its own transaction. If the client disables autocommit mode, then transactions must be explicitly started and ended by the client.

The client uses a TRANS request to begin, commit, or rollback the current transaction. If successful, the server sends a DONE.

(4k) Establishing Parameter Metadata

If a prepared query has any parameters, the client must establish metadata for them, as this is needed to determine the format of data to send or receive for those parameters. This can be done in two ways: the client can ask for parameter metadata from the server with a DESCARGS request; the client can provide parameter metadata itself with one or more ARGS requests, or directly in the EXEC request.

A DESCARGS request will cause the server to recompute parameter metadata before returning it. Subsequent ARGS requests will then overwrite metadata for whichever parameters they describe.

An EXEC request will fail if there are any parameters in the query for which parameter metadata has not been established. If metadata has not been established for a parameter, a DATA request will fail. The client will send and receive parameter data for the command in requests and responses in a format dictated by this metadata.

(4L) Warnings and Errors

The INFO response represents warnings and errors. This response may be returned for any request.

(5) Exceptional messaging

In an illustrative embodiment, the server maintains a UDP socket alongside the TCP listening socket it uses for accepting connections. This UDP socket uses the same address and port as the listening socket. This socket is used to accept OOB (Out-of-Band) messages from clients. This allows the clients to send messages to the server while their main channel of communication (the TCP/IP connection) is busy with other requests.

Currently, there are two types of OOB requests: Cancel requests and stop requests. (i) For OB_Cancel, the server cancels the associated requests. If a request is canceled, the client will return an error response for that request.

(ii) See (4H) for information about OB_Stop.

(6) Multiple Network Connections Per Logical Connection

A logical connection consists of one or more network connections between a client and server. Network connections are associated by the LOGIN/CLONE relationship. When initiating a logical connection, the client connects to the server and does a pre-login handshake to negotiate version and API types, optionally enables SSL and does network authentication, before completing the connection with a LOGIN request, which sends the connection string.

If the LOGIN completes successfully, the server will send a 'clone key' in the LOGIN response, along with a 16-byte 'worker GUID' which identifies the worker. The clone key is an opaque value, which can be used once to 'clone' a network connection. The client does this by creating a new network connection to the server, sending the worker GUID, then sending a CLONE request with the given clone key. This allows the server to securely associate the new network connection with the existing logical connection.

Generic Computer Device

Figure 8:
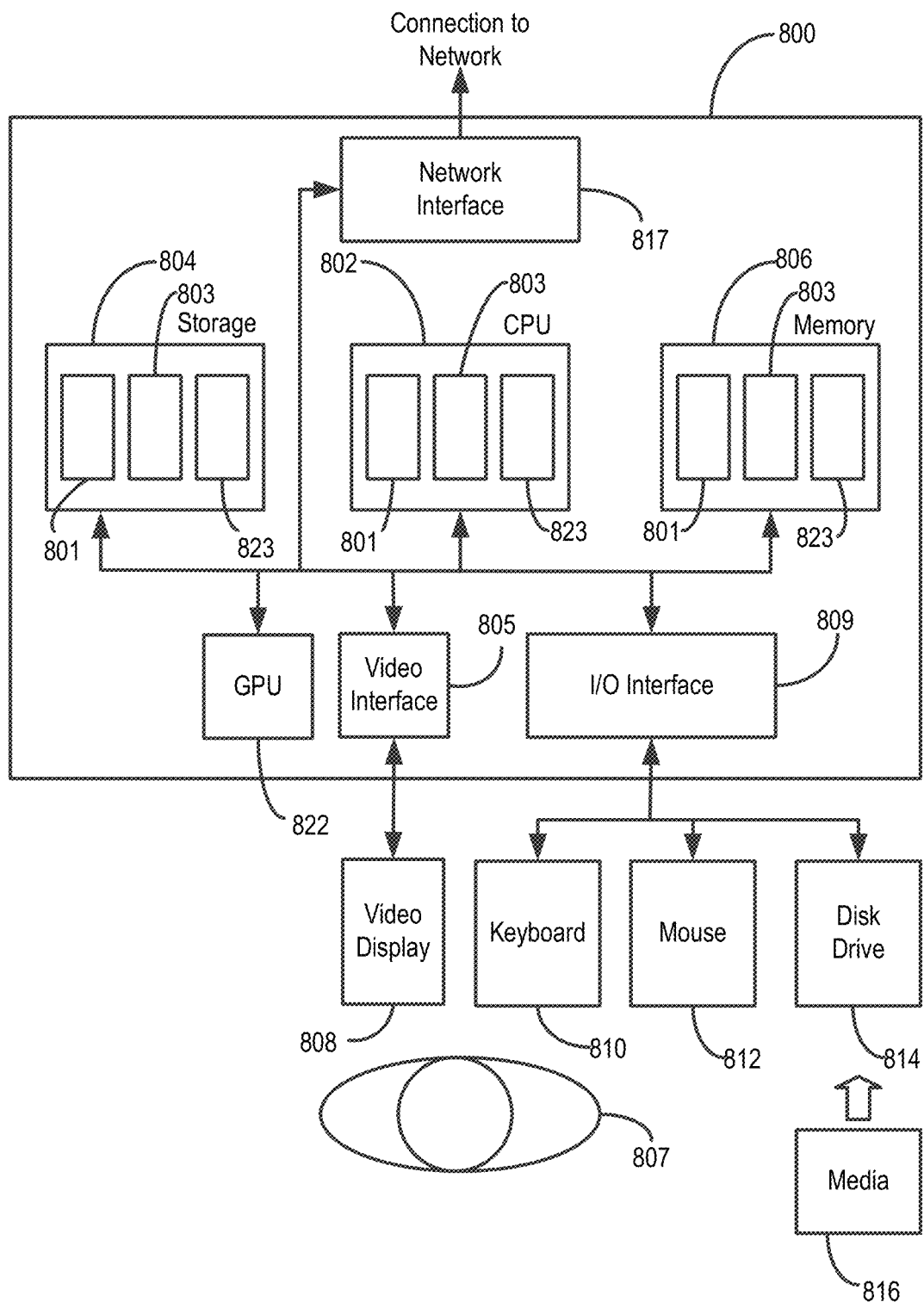
FIG. 8 illustrates a schematic block diagram of a generic computer which may provide a suitable operating environment for one or more embodiments.

Now referring to FIG. 8 shown is a schematic block diagram of a generic computing device that may provide a suitable operating environment for one or more embodiments of the adaptive data transfer protocol as described above. One or more suitably configured computer devices, and associated communications networks, devices, software and firmware may collectively provide a platform for enabling one or more embodiments. By way of example, FIG. 8 shows a generic computer device 800 that may include a central processing unit ("CPU") 802 connected to a storage unit 804 and to a random access memory 806. The CPU 802 may process an operating system 801, application program 803, and data 823. The operating system 801, application program 803, and data 823 may be stored in storage unit 804 and loaded into memory 806, as may be required. Computer device 800 may further include a graphics processing unit (GPU) 822 which is operatively connected to CPU 802 and to memory 806 to offload intensive image processing calculations from CPU 802 and run these calculations in parallel with CPU 802. An operator 810 may interact with the computer device 800 using a video display 808 connected by a video interface 805, and various input/output devices such as a keyboard 810, pointer 812, and storage 814 connected by an I/O interface 809. In known manner, the pointer 812 may be configured to control movement of a cursor or pointer icon in the video display 808, and to operate various graphical user interface (GUI) controls appearing in the video display 808. The computer device 800 may form part of a network via a network interface 811, allowing the computer device 800 to communicate with other suitably configured data processing systems or circuits.

Thus, in an aspect, there is provided a computer-implemented method operable on one or more computer devices in a client server data query environment, each of the one or more computer devices having a processor and a memory, the method comprising: opening a logical network connection between a client and a server, the server communicating with a data source; initiating a data request from the client; in response to the data request from the client, preparing a data transfer response from the server utilizing an adaptive data transfer protocol, the adaptive data transfer protocol configured to: create multiple network connections within the logical connection; analyze performance metrics including variable processor load on the one or more computing devices, and network load over the multiple network connections; analyze the data required to be retrieved from the data source and transferred over the multiple network connections; and adaptively prepare the data retrieved from the data source based on their data types and values for transfer over the multiple network connections to improve total response time to fulfill the data request.

In an embodiment, creating multiple network connections within the logical connection comprises cloning an existing network connection.

In another embodiment, the method further comprises load-balancing the transmission of the data retrieved from the data source over the multiple network connections to improve total response time to fulfill the data request.

In another embodiment, the method further comprises adaptively compressing the data retrieved from the data source based on the analysis of the performance metrics and analysis of the data required to be retrieved from the data source and transmitted, if compression will result in improved total response time to fulfill the data request.

In another embodiment, adaptively compressing the data retrieved from the data source comprises double compression for reducing data size for faster transmission with minimal impact on processor load.

In another embodiment, the adaptive data transfer protocol is further configured to adaptively prepare the data retrieved from the data source by controlling one or more of compression, parallelism, and size of network transmission units.

In another embodiment, the adaptive data transfer protocol is further configured to create multiple logical connections, each logical connection capable of one or more cloned network connections, and to utilize all network connections in all logical connections in parallel.

In another aspect, there is provided a computer-implemented system comprising one or more computer devices in a client server data query environment, each of the one or more computer devices having a processor and a memory, the system configured to: open a logical network connection between a client and a server, the server communicating with a data source; initiate a data request from the client; prepare, in response to the data request from the client, a data transfer response from the server utilizing an adaptive data transfer protocol, the adaptive data transfer protocol configured to: create multiple network connections within the logical connection; analyze performance metrics including variable processor load on the one or more computing devices, and network load over the multiple network connections; analyze the data required to be retrieved from the data source and transferred over the multiple network connections; and adaptively prepare the data retrieved from the data source based on their data types and values for transfer over the multiple network connections to improve total response time to fulfill the data request.

In an embodiment, creating multiple network connections within the logical connection comprises cloning an existing network connection.

In another embodiment, the system is further configured to load-balance the transmission of the data retrieved from the data source over the multiple network connections to improve total response time to fulfill the data request.

In another embodiment, the system is further configured to adaptively compress data required to be retrieved from the data source and transmitted based on the analysis of the performance metrics and analysis of the data retrieved from the data source, if compression will result in improved total response time to fulfill the data request.

In another embodiment, adaptively compressing the data retrieved from the data source comprises double compression for reducing data size for faster transmission with minimal impact on processor load.

In another embodiment, the system is further configured to adaptively prepare the data retrieved from the data source by controlling one or more of compression, parallelism, and size of network transmission units.

In another embodiment, the adaptive data transfer protocol is further configured to create multiple logical connections, each logical connection capable of one or more cloned network connections, and to utilize all network connections in all logical connections in parallel.

In another aspect, there is provided a non-transitory computer readable medium storing code executable on one or more computer devices in a client server data query environment, each of the one or more computer devices having a processor and a memory, the non-transitory computer readable medium comprising: code for opening a logical network connection between a client and a server, the server communicating with a data source; code for initiating a data request from the client; code for preparing, in response to the data request from the client, a data transfer response from the server utilizing an adaptive data transfer protocol, the adaptive data transfer protocol configured to: create multiple network connections within the logical connection; analyze performance metrics including variable processor load on the one or more computing devices, and network load over the multiple network connections; analyze the data required to be retrieved from the data source and transferred over the multiple network connections; and adaptively prepare the data retrieved from the data source based on their data types and values for transfer over the multiple network connections to improve total response time to fulfill the data request.

In an embodiment, creating multiple network connections within the logical connection comprises cloning an existing network connection.

In another embodiment, the non-transitory computer readable medium further comprises code for load-balancing the transmission of the data retrieved from the data source over the multiple network connections to improve total response time to fulfill the data request.

In another embodiment, the non-transitory computer readable medium further comprises code for adaptively compressing the data retrieved from the data source based on the analysis of the performance metrics and analysis of the data required to be retrieved from the data source and transmitted, if compression will result in improved total response time to fulfill the data request.

In another embodiment, adaptively compressing the data retrieved from the data source comprises double compression for reducing data size for faster transmission with minimal impact on processor load.

In another embodiment, the adaptive data transfer protocol is further configured to adaptively prepare the data retrieved from the data source by controlling one or more of compression, parallelism, and size of network transmission units.

While illustrative embodiments have been described above by way of example, it will be appreciated that various changes and modifications may be made without departing from the scope of the invention, which is defined by the following claims.

The invention claimed is:

1. A computer-implemented method operable on one or more computer devices in a client server data query environment for improving total response time to fulfill a data request, each of the one or more computer devices having a processor and a memory, the method comprising:
   opening a logical network connection between a client and a server, the server communicating with a data source;
   initiating a data request from the client;
   in response to the data request from the client, preparing a data transfer response from the server utilizing an adaptive data transfer protocol, the adaptive data transfer protocol configured to:
      create multiple network connections within the logical connection;
      analyze performance metrics including variable processor load on the one or more computing devices, and network load over the multiple network connections;
      analyze the data required to be retrieved from the data source and transferred over the multiple network connections;
      adaptively prepare the data retrieved from the data source based on their data types and values for transfer over the multiple network connections; and
      based on the analysis of the performance metrics and analysis of the data required to be retrieved from the data source and transmitted, adaptively compress the data retrieved from the data source if compression will result in a compression ratio exceeding a threshold value, thereby improving total response time to fulfill the data request.

2. The computer-implemented method of claim 1, wherein creating multiple network connections within the logical connection comprises cloning an existing network connection.

3. The computer-implemented method of claim 1, further comprising load-balancing the transmission of the data retrieved from the data source over the multiple network connections to improve total response time to fulfill the data request.

4. The computer-implemented method of claim 1, wherein adaptively compressing the data retrieved from the data source comprises double compression for reducing data size for faster transmission with minimal impact on processor load.

5. The computer-implemented method of claim 1, wherein the adaptive data transfer protocol is further configured to adaptively prepare the data retrieved from the data source by controlling one or more of compression, parallelism, and size of network transmission units.

6. The computer-implemented method of claim 1, wherein the adaptive data transfer protocol is further configured to create multiple logical connections, each logical connection capable of one or more cloned network connections, and to utilize all network connections in all logical connections in parallel.

7. A computer-implemented system comprising one or more computer devices in a client server data query environment for improving total response time to fulfill a data request, each of the one or more computer devices having a processor and a memory, the system configured to:
open a logical network connection between a client and a server, the server communicating with a data source;
initiate a data request from the client;
prepare, in response to the data request from the client, a data transfer response from the server utilizing an adaptive data transfer protocol, the adaptive data transfer protocol configured to:
create multiple network connections within the logical connection;
analyze performance metrics including variable processor load on the one or more computing devices, and network load over the multiple network connections;
analyze the data required to be retrieved from the data source and transferred over the multiple network connections;
adaptively prepare the data retrieved from the data source based on their data types and values for transfer over the multiple network connections; and
based on the analysis of the performance metrics and analysis of the data required to be retrieved from the data source and transmitted, adaptively compress the data retrieved from the data source if compression will result in a compression ratio exceeding a threshold value, thereby improving total response time to fulfill the data request.

8. The computer-implemented system of claim 7, wherein creating multiple network connections within the logical connection comprises cloning an existing network connection.

9. The computer-implemented system of claim 7, wherein the system is further configured to load-balance the transmission of the data retrieved from the data source over the multiple network connections to improve total response time to fulfill the data request.

10. The computer-implemented system of claim 7, wherein adaptively compressing the data retrieved from the data source comprises double compression for reducing data size for faster transmission with minimal impact on processor load.

11. The computer-implemented system of claim 7, wherein the system is further configured to adaptively prepare the data retrieved from the data source by controlling one or more of compression, parallelism, and size of network transmission units.

12. The computer-implemented system of claim 7, wherein the adaptive data transfer protocol is further configured to create multiple logical connections, each logical connection capable of one or more cloned network connections, and to utilize all network connections in all logical connections in parallel.

13. A non-transitory computer readable medium storing code executable on one or more computer devices in a client server data query environment for improving total response time to fulfill a data request, each of the one or more computer devices having a processor and a memory, the non-transitory computer readable medium comprising:
code for opening a logical network connection between a client and a server, the server communicating with a data source;
code for initiating a data request from the client;
code for preparing, in response to the data request from the client, a data transfer response from the server utilizing an adaptive data transfer protocol, the adaptive data transfer protocol configured to:
create multiple network connections within the logical connection;
analyze performance metrics including variable processor load on the one or more computing devices, and network load over the multiple network connections;
analyze the data required to be retrieved from the data source and transferred over the multiple network connections;
adaptively prepare the data retrieved from the data source based on their data types and values for transfer over the multiple network connections; and
based on the analysis of the performance metrics and analysis of the data required to be retrieved from the data source and transmitted, adaptively compress the data retrieved from the data source if compression will result in a compression ratio exceeding a threshold value, thereby improving total response time to fulfill the data request.

14. The non-transitory computer readable medium of claim 13, wherein creating multiple network connections within the logical connection comprises cloning an existing network connection.

15. The non-transitory computer readable medium of claim 13, further comprising code for load-balancing the transmission of the data retrieved from the data source over the multiple network connections to improve total response time to fulfill the data request.

16. The non-transitory computer readable medium of claim 13, wherein adaptively compressing the data retrieved from the data source comprises double compression for reducing data size for faster transmission with minimal impact on processor load.

17. The non-transitory computer readable medium of claim of claim 13, wherein the adaptive data transfer protocol is further configured to adaptively prepare the data retrieved from the data source by controlling one or more of compression, parallelism, and size of network transmission units.

* * * * *